US011531337B2

(12) United States Patent
Bosworth (10) Patent No.: US 11,531,337 B2
(45) Date of Patent: Dec. 20, 2022

(54) SYSTEMS AND METHODS FOR SURVEILLANCE

(71) Applicant: Aurora Flight Sciences Corporation, Manassas, VA (US)

(72) Inventor: William Robert Bosworth, Somerville, MA (US)

(73) Assignee: The Boeing Company, Chicago, IL (US)

( * ) Notice: Subject to any disclaimer, the term of this patent is extended or adjusted under 35 U.S.C. 154(b) by 438 days.

(21) Appl. No.: 16/601,810

(22) Filed: Oct. 15, 2019

(65) Prior Publication Data

US 2021/0109516 A1   Apr. 15, 2021

(51) Int. Cl.
| | | |
|---|---|---|
| *G05D 1/00* | (2006.01) | |
| *G08G 5/00* | (2006.01) | |
| *B64C 39/02* | (2006.01) | |
| *H04W 4/029* | (2018.01) | |

(52) U.S. Cl.
CPC ......... *G05D 1/0027* (2013.01); *B64C 39/024* (2013.01); *G08G 5/003* (2013.01); *H04W 4/029* (2018.02); *B64C 2201/082* (2013.01); *B64C 2201/12* (2013.01); *B64C 2201/141* (2013.01); *B64C 2201/205* (2013.01)

(58) Field of Classification Search
CPC .... G05D 1/0027; G05D 1/104; B64C 39/024; B64C 2201/082; B64C 2201/12; B64C 2201/141; B64C 2201/205; B64C 2201/027; B64C 2201/122; G08G 5/003; G08G 5/0008; G08G 5/0021; G08G 5/0043; G08G 5/006; G08G 5/0069; H04W 4/029

See application file for complete search history.

(56) References Cited

U.S. PATENT DOCUMENTS

| | | | | |
|---|---|---|---|---|
| 10,170,011 | B2* | 1/2019 | Castelli ................. | G08G 5/065 |
| 10,179,648 | B2* | 1/2019 | Chin ........................ | B64D 5/00 |
| 2014/0018979 | A1* | 1/2014 | Goossen .............. | G06Q 10/047 |
| | | | | 701/3 |
| 2016/0023762 | A1* | 1/2016 | Wang ........................ | B60R 9/00 |
| | | | | 701/3 |
| 2016/0068267 | A1* | 3/2016 | Liu ...................... | G05D 1/0088 |
| | | | | 701/4 |
| 2016/0214717 | A1* | 7/2016 | De Silva .................. | B64D 5/00 |
| 2017/0349281 | A1* | 12/2017 | Quinlan .................. | B64D 1/12 |
| 2017/0369169 | A1* | 12/2017 | Lee ....................... | B64C 39/024 |

(Continued)

OTHER PUBLICATIONS

DJI Phantom Drone, https://www.dji.com/phantom, accessed Oct. 11, 2019.

(Continued)

*Primary Examiner* — Truc M Do (74) *Attorney, Agent, or Firm* — McDonnell Boehnen Hulbert & Berghoff LLP (57) ABSTRACT

An example system for flying to a target location is provided, comprising a parent aerial vehicle and at least one child vehicle releasably coupled to the parent vehicle. The parent vehicle is configured to transport the at least one child aerial vehicle to a region containing a target location, uncouple from the at least one child aerial vehicle, and transmit information to the at least one child aerial vehicle relevant to operation of the child aerial vehicle. The child aerial vehicle comprises at least one sensor for surveillance at the target location.

20 Claims, 6 Drawing Sheets

(56) References Cited

U.S. PATENT DOCUMENTS

2018/0155021 A1* 6/2018 Patterson ............ B64C 29/0033
2018/0211263 A1* 7/2018 Gong ................... G08G 5/0034
2019/0265705 A1* 8/2019 Zhang .................... G01C 21/20

OTHER PUBLICATIONS

Boeing Unveils New Unmanned Cargo Air Vehicle Prototype article dated Jan. 10, 2019, https://boeing.mediaroom.com/2019-01-10-Boeing-Unveils-New-Unmanned-Cargo-Air-Vehicle-Prototype, accessed Oct. 11, 2019.

* cited by examiner

SYSTEMS AND METHODS FOR SURVEILLANCE

FIELD

The present disclosure generally relates to systems and methods for flying to and surveillance at a target location, and more particularly to a multi aircraft system, wherein a parent aerial vehicle transports a child aerial vehicle to a region containing a target location and then releases the child aerial vehicle to complete its trajectory to the target location and perform surveillance at the target location.

BACKGROUND

Aerial vehicles are increasingly used in a wide variety of applications. For example, aerial vehicles may be deployed to survey or monitor a location or to deliver information on a target. Aerial vehicles may be deployed from a number of platforms, such as from land or from a deck of a ship on a body of water. Aerial vehicles equipped with one or more sensors, cameras, or global positioning system (GPS) equipment can fly to a designated location, land on or hover over the location, and record video or audio footage, as examples.

Certain types of locations designated for surveillance by an aerial vehicle are difficult or require significant propulsion power for an aerial vehicle to fly to. The littoral zone, which is an area of water close to the shore, is an example of a location that requires a significant amount of aerial vehicle propulsion power to fly through. To further exacerbate flight difficulty, unpredictable wind conditions are often present in the littoral zone. Another example environment that presents flight difficulties is an urban environment comprising a large number of densely packed mid-rise and high-rise buildings. To dock on top of a designated building, an aerial vehicle must first navigate through buildings within the urban environment, rise high in the air above the designated building, and then lower for landing.

Due to the scaling of vehicle design, a larger aerial vehicle will have more control authority, longer flight duration capabilities, and more payload capacity for computation, memory, sensors, and other attachments. These attributes are beneficial for a larger aerial vehicle to be able to fly a potentially long distance and navigate adverse environmental conditions to reach the general proximity of a target location. However, such a vehicle is expensive and dangerous to operate too close to a target present in an object-dense environment (e.g., buildings in an urban setting, cliffs off of a beach or water, or a tree in a forest). Moreover, a large vehicle is more readily detectable and requires a larger area that can serve as a suitable landing spot. A smaller vehicle can more easily navigate through tighter spaces, land, and unobtrusively perform surveillance functions.

SUMMARY

In one example, a system including a parent aerial vehicle and at least one child aerial vehicle is described. The parent vehicle comprises a first set of sensors and the at least one child aerial vehicle comprises a second set of sensors and is releasably coupled to the parent aerial vehicle. The parent aerial vehicle is configured to transport the at least one child aerial vehicle to a region containing a target location, uncouple from the at least one child aerial vehicle, and transmit information to the at least one child aerial vehicle relevant to operation of the child aerial vehicle.

The parent aerial vehicle of the system may further comprise instructions stored in a non-transitory computer readable storage medium that, when executed by a processor, cause the processor to analyze received data providing geolocation and environment information for the region, plan a path for the child aerial vehicle to reach the target location, and transmit instructions to the child aerial vehicle to navigate to the target location.

In another example, a parent aerial vehicle is described. The parent aerial vehicle comprises a housing configured to carry a child aerial vehicle, a release mechanism to release the child aerial vehicle from the housing, one or more sensors for detecting one or more conditions in an environment, and instructions stored in memory that are executed by a processor. The instructions are executed by the processor to perform the functions of determining that the parent aerial vehicle is hovering above a region containing a target location, operating the release mechanism to release the child aerial vehicle, receiving data providing geolocation and environment information for the region, and transmitting navigation instructions to the child aerial vehicle to direct the child aerial vehicle to travel to the target location.

In another example, a method is described. The method comprises receiving instructions at a parent aerial vehicle to fly to a region containing a target location, determining that the parent aerial vehicle is hovering above the region, operating a release mechanism to release a child aerial vehicle from the parent aerial vehicle, receiving data providing at least one of geolocation or environment information for the region, and transmitting instructions to the child aerial vehicle to direct the child aerial vehicle to travel to the target location.

The features, functions, and advantages that have been discussed can be achieved independently in various examples or may be combined in yet other examples further details of which can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

DETAILED DESCRIPTION

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Examples, methods, and systems are described to transport an aerial vehicle to a target location for surveillance at the target location. The system and methods described herein decouple longer distance transportation of an aerial vehicle to a desired approximate landing zone from fine control of that aerial vehicle to reach its final docking point. To this end, a parent aerial vehicle transports a child aerial vehicle from a location of launch to a region containing a target location, and then separates from the child aerial vehicle, leaving the child aerial vehicle to proceed to fly and complete its journey to the target location. This system takes advantage of the benefits that come with flying a larger aerial vehicle (the parent aerial vehicle), which will have more control authority and longer flight duration capabilities to complete the bulk of a journey. The parent aerial vehicle then separates from the child aerial vehicle, allowing the child aerial vehicle to complete a relatively short trajectory to a target location and to thereby conserve its power for surveillance at the target location. Further, the child aerial vehicle may be designed to more nimbly navigate, land, and unobtrusively or surreptitiously perform surveillance functions.

Figure 1:
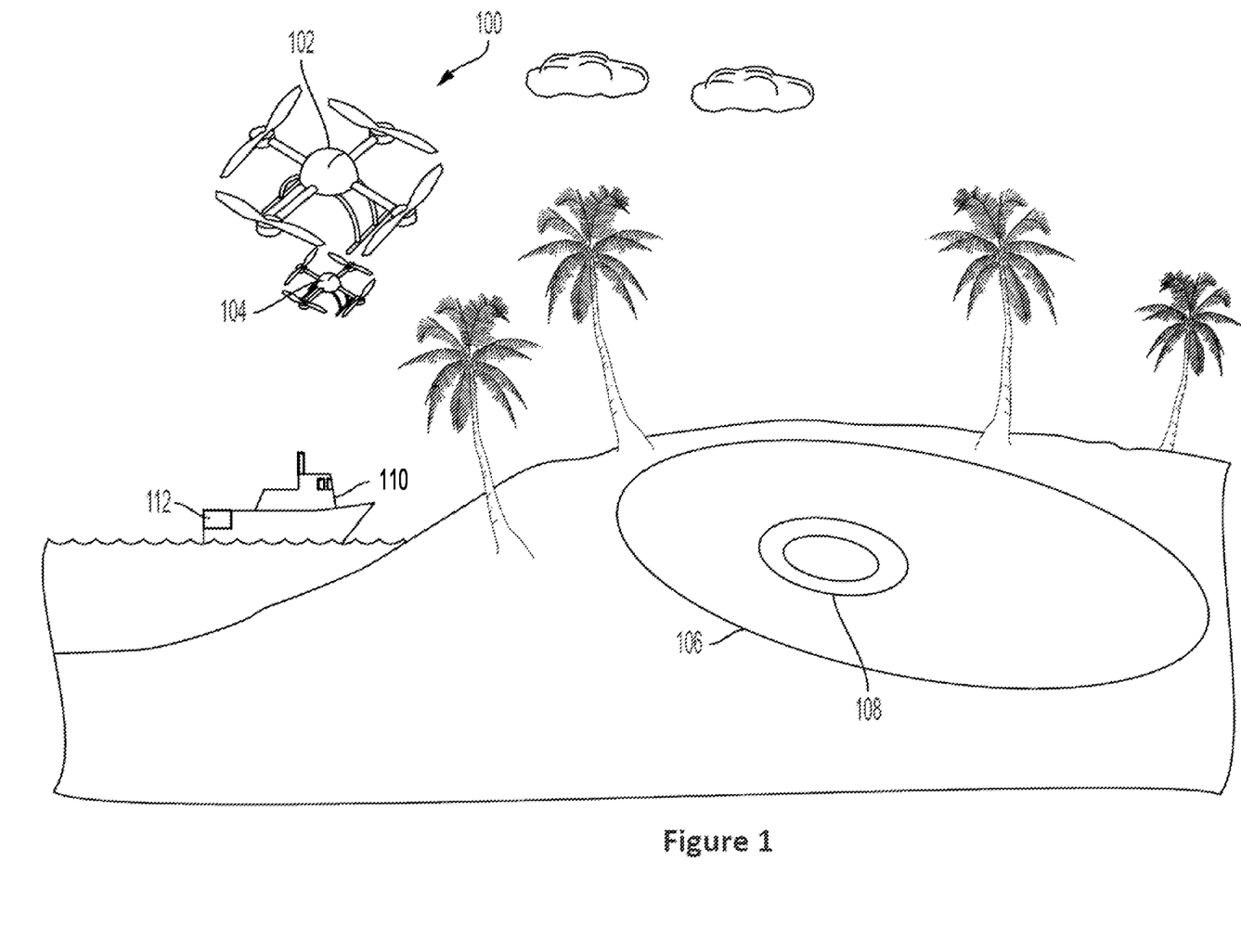
FIG. 1 illustrates a system for transporting an aerial vehicle to a target location to perform surveillance at the target location, according to an example implementation.

Referring to FIG. 1, a system 100 to transport a child aerial vehicle to a target location 108 to perform surveillance at the target location is illustrated, according to an example implementation.

The system 100 includes a parent aerial vehicle 102 to which the child aerial vehicle 104 is coupled. In some examples, a plurality of child aerial vehicles 104 are coupled to the parent aerial vehicle 102.

The parent aerial vehicle 102 is configured to be stationed on and launch from a transport device 110. The transport device 110 shown in FIG. 1 is a water transport device; however, the transport device 110 may take the form of a land transport device (e.g., a car, truck, bus), or another aerial device (e.g., a plane, helicopter, or the like). The transport device 110 may include launch and recover ports 112 thereon that serve to store and transport each parent aerial vehicle 102 and its associated one or more child aerial vehicles 104, as well as to provide a location from which the parent aerial vehicle 102 can launch and then return to and dock. To this end, the launch and recover ports 112 may take the form of an enclosure within the transport device 110 having a retractable cover to shield aerial vehicles from the environment during transport. Additionally, the launch and recover ports 112 may include mechanisms to secure aerial vehicles when docked.

The parent aerial vehicle 102 is configured to launch from its launch and recover port 112 and fly to a region 106 containing the target location 108. In some examples, the target location 108 is defined by a latitude, a longitude, and an altitude above sea level (e.g., the location may be geo-referenced). In these examples, a flight path may be determined based on the latitude and the longitude of the target location, as well as the altitude, and any detected parameters relative to the target location (e.g., obstacles). A remote control system, which will be described in further detail herein, may determine a flight path for one or both of the parent aerial vehicle 102 and the child aerial vehicle 104. Alternatively, the parent aerial vehicle may determine its own flight path.

The parent aerial vehicle 102 and the child aerial vehicle 104 each may include a main housing and a propulsion unit mounted on the main housing for propelling through an environment. The propulsion unit may be an internal combustion engine, an electric battery, or a hybrid engine such as an electric-internal combustion engine. The parent aerial vehicle 102 and the child aerial vehicle 104 may each further comprise one or more rotor systems, a fixed wing, or fixed wing hybrid assembly coupled to the housing and operatively connected to the propulsion unit. In one example, a rotor system comprising one or more propeller blades is attached to the main housing via an arm extending from the housing. The main housing may further include one or more payload bays for containing various payloads.

The parent aerial vehicle 102 and the child aerial vehicle 104 may have differing flight capabilities, propulsion and/or battery power, payload carrying capabilities, and computational resources. For example, the parent aerial vehicle 102 may be configured to fly longer distances than the child aerial vehicle 104, carry heavier payloads, and provide more computational resources than the child aerial vehicle 104, as well as have a higher degree of autonomy than the child aerial vehicle 104.

The parent aerial vehicle 102 may be a manned or an unmanned aerial vehicle (UAV). In some examples, the parent aerial vehicle 102 is a vertical takeoff and landing (VTOL) aircraft, and may specifically be an electric vertical takeoff and landing (eVTOL) aircraft. In one example, the parent aerial vehicle 102 is designed for long-term flights up to about 100 miles. In some examples, the parent aerial vehicle 102 is designed for flights in the range of 5-60 miles. For example, the parent aerial vehicle 102 may be configured for a flight endurance of over 20 hours and an operation radius of up to about 60 miles, while being able to carry payloads of up to about 25-45 lbs. In another example, the parent aerial vehicle 102 may be a helicopter weighing up to about 200 lbs that can carry up to about 65 lbs, having a cruise speed of 60 miles per hour.

The first set of sensors on the parent aerial vehicle 102 may include sensors useful for identifying objects and aiding in navigation, such as optical sensors (e.g., camera, infrared, RGB camera), acoustic sensors, radar sensors, and a multifunction light detection and ranging (LIDAR) system.

Examples of computational resources on the parent aerial vehicle 102 may include, but are not limited to, built-in control systems for receiving and storing information and executing instructions to control the child aerial vehicle 104, guidance systems to perform low-level human pilot duties such as speed and flight-path stabilization, and scripted navigation functions. The parent aerial vehicle 102 may also include a communication interface for receiving instructions from a remote control system and for transmitting the information to at least one child aerial vehicle 104.

Navigation instructions may be generated by the parent aerial vehicle 102 for transmission to the child aerial vehicle 104. The parent aerial vehicle may combine location information of the child aerial vehicle 104 with one or more conditions detected via sensors of the environment at or near the target location to generate a navigation path for the child aerial vehicle 104, and then send navigation instructions to the child aerial vehicle 104 that correlate to the navigation path.

The child aerial vehicle 104 is an unmanned aerial vehicle and may have less flight capabilities, propulsion power, and computational resources than the parent aerial vehicle 102. The child aerial vehicle 104 may be designed for "perch and stare" operations (wherein the vehicle lands and settles at a higher altitude location and, through sensor intake, provides for long-term observations) and it may be desirable for certain reconnaissance operations that the child aerial vehicle 104 have as small of a profile as possible to avoid detection. The child aerial vehicle 104 may be a microscale unmanned aerial vehicle, in one example. For example, the child aerial vehicle 104 may weigh about 5 lbs and have payload carrying capabilities of up to about 4.5 lbs. In another example, the child aerial vehicle 104 may weigh about 2 lbs. However, with a reduced size comes reduced battery and payload capacity. Thus, the child aerial vehicle 104 may only be capable of short-term flights up to about 1-12 miles. Further, the child aerial vehicle 104 may have few computational resources and a low degree of autonomy.

The child aerial vehicle 104 may include a second set of sensors, wherein the sensors are primarily designed for surveillance, such as optical (e.g., camera, infrared, RGB camera) and acoustic sensors. The child aerial vehicle 104 may be configured to transmit its obtained image and audio data to the parent aerial vehicle 102 or a remote control system. The child aerial vehicle 104 may further transmit location data of its current location if appropriate sensors for obtaining such data are present (e.g., GPS or inertial measurement unit (IMU) sensors) on the vehicle.

The communication interface on the parent aerial vehicle 102 may be used to transmit information to the at least one child aerial vehicle 104 comprising one or more of: navigation instructions for the at least one child aerial vehicle to reach the target location, instructions for the at least one child aerial vehicle to operate the at least one sensor and to store information received from the at least one sensor, or navigation instructions for the at least one child aerial vehicle 104 to return to the parent aerial vehicle 102 for re-coupling.

The computational resources of the child aerial vehicle 104 and the parent aerial vehicle 102 may combine information from different sensors to detect obstacles on the ground or in the air, communicate with each other or another remote network or server, determine an optimal flight path based on constraints or to go from a starting location to a target location, and regulate a trajectory.

Figure 2:
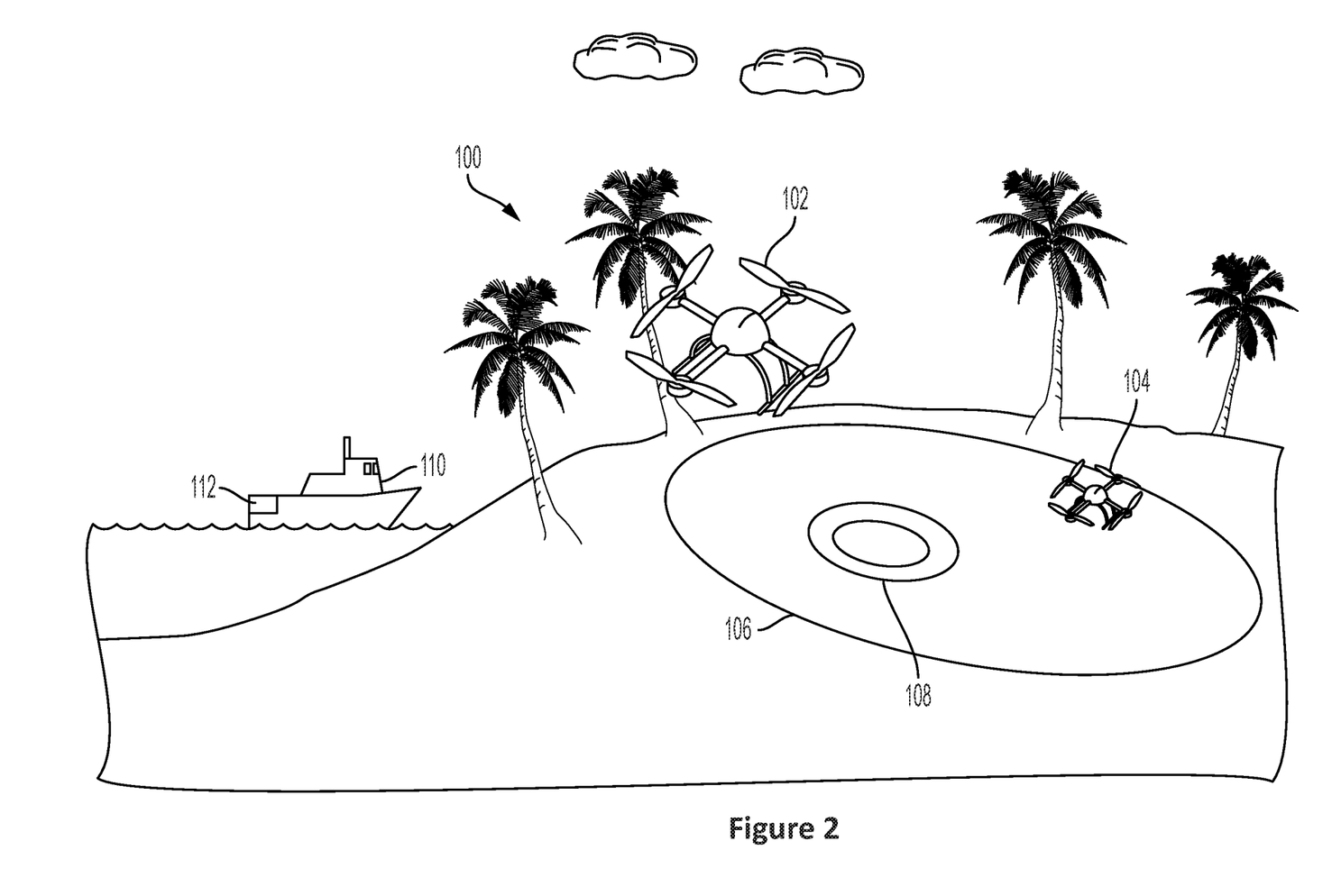
FIG. 2 illustrates the system of FIG. 1, wherein the child aerial vehicle is decoupled from the parent aerial vehicle, according to an example implementation.

FIG. 2 illustrates the system of FIG. 1, wherein the child aerial vehicle 104 is decoupled from the parent aerial vehicle 102, according to an example implementation. In some examples, the parent aerial vehicle 102 is configured to make a determination that the parent aerial vehicle 102 is hovering above the region 106 containing the target location 108 and then actuate its release mechanism to release the child aerial vehicle 104 from its connection to the parent aerial vehicle 102. In this uncoupled state, shown in FIG. 2, the parent aerial vehicle 102 may continue to facilitate travel of its child aerial vehicle 104 to the target location 108 by transmitting navigation instructions to the child aerial vehicle.

In one example, a child aerial vehicle 104 is mechanically coupled to the underside of the parent aerial vehicle 102 such that the child aerial vehicle is suspended below the parent aerial vehicle 102. In this suspension example, the child aerial vehicle 104 may be attached to the parent aerial vehicle 102 via a hook and loop closure, for example, wherein the loop portion can be opened so as to release the hook and allow the child aerial vehicle 104 to drop away from the parent aerial vehicle 102. In another example, the child aerial vehicle 104 is coupled to a top surface of the parent aerial vehicle 102 such that the child aerial vehicle 104 rests on or above the top surface of the parent aerial vehicle 102. In this type of example, a track and guide assembly may be formed on the top surface of the parent aerial vehicle 102 and the child aerial vehicle 104 may launch from and land on the track. In yet another example, extensible and retractable connectors may be present on any surface of the parent aerial vehicle 102 to latch onto or release a child aerial vehicle. Still further, the parent aerial vehicle 102 may house the child aerial vehicle 104 within an internal chamber, and open a door to either release or to receive the child aerial vehicle 104. In this manner, the parent aerial vehicle 102 may protect the child aerial vehicle 104 from damage that may be inflicted from an exterior environment. Still other mechanisms for coupling and uncoupling the aerial vehicles may be envisioned. In one example, the parent aerial vehicle 102 comprises a launch and recovery system, with the launch mechanism comprising a sling shot, such as a mechanical spring or a pneumatic launch. A hydraulic powered unit comprising a mast and rope may use the rope to capture and thereby recover an incoming child aerial vehicle 104. In another example, a portable apparatus comprising a mechanical arm extending may be used to horizontally launch and recover a child aerial vehicle 104. Still further, the child aerial vehicle 104 may simply land in a conventional manner on a surface upon completion of a flight.

Once decoupled from the parent aerial vehicle 102, the child aerial vehicle 104 may be remotely controlled by the parent aerial vehicle 102 via broadcast communications with the parent aerial vehicle 102. The parent aerial vehicle 102 may, for example, transmit instructions to a child aerial vehicle 104 to navigate to the target location 108, to operate at least one sensor, to store information received from at least one sensor, and to return to and re-couple to the parent aerial vehicle 102. Alternatively, the child aerial vehicle 104 may have the capability of navigating to the target location 108 without aid from its parent aerial vehicle 102 or a remote control system and may direct itself from the target location 108 back to the parent aerial vehicle 102. Thus, the child aerial vehicle 104 may operate in a semi or fully autonomous state once decoupled from the parent aerial vehicle 102.

Figure 3:
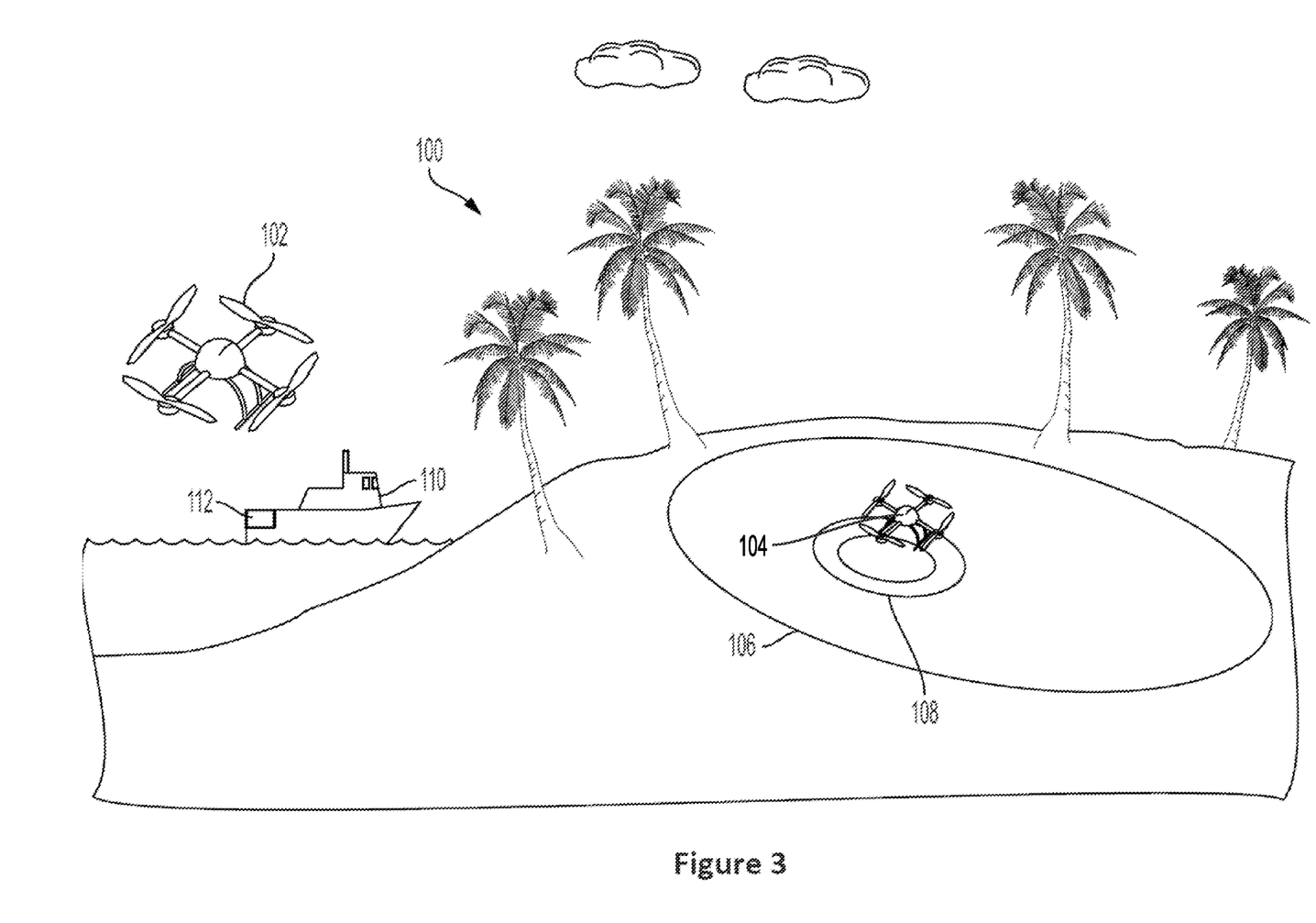
FIG. 3 illustrates the system of FIG. 1, wherein the parent aerial vehicle is en route to return to its launch location and the child aerial vehicle is at the target location, according to an example implementation.

FIG. 3 illustrates the system of FIG. 1, wherein the parent aerial vehicle is en route to return to its launch and recover port 112 and the child aerial vehicle is at the target location 108, according to an example implementation. After the child aerial vehicle 104 has successfully uncoupled from the parent aerial vehicle 102 and reached the target location 108, a suitable spot on which to land is located. Any of the child aerial vehicle 104, the parent aerial vehicle 102, or a remote control system may aid in locating a suitable spot for the child aerial vehicle 104 to land. Upon landing, the child aerial vehicle 104 may shut down its propulsion unit and operate its one or more sensors to obtain information concerning an environment at or near the target location 108. While the child aerial vehicle 104 is at the target location, the parent aerial vehicle 102 may return to the transport device 110. The launch and recover port 112 can receive the parent aerial vehicle 102, wherein the parent aerial vehicle can re-charge or re-fuel to prepare for the flight back to the region 106 to recover the child aerial vehicle 104 when the child aerial vehicle 104 has completed its reconnaissance mission.

Figure 4:
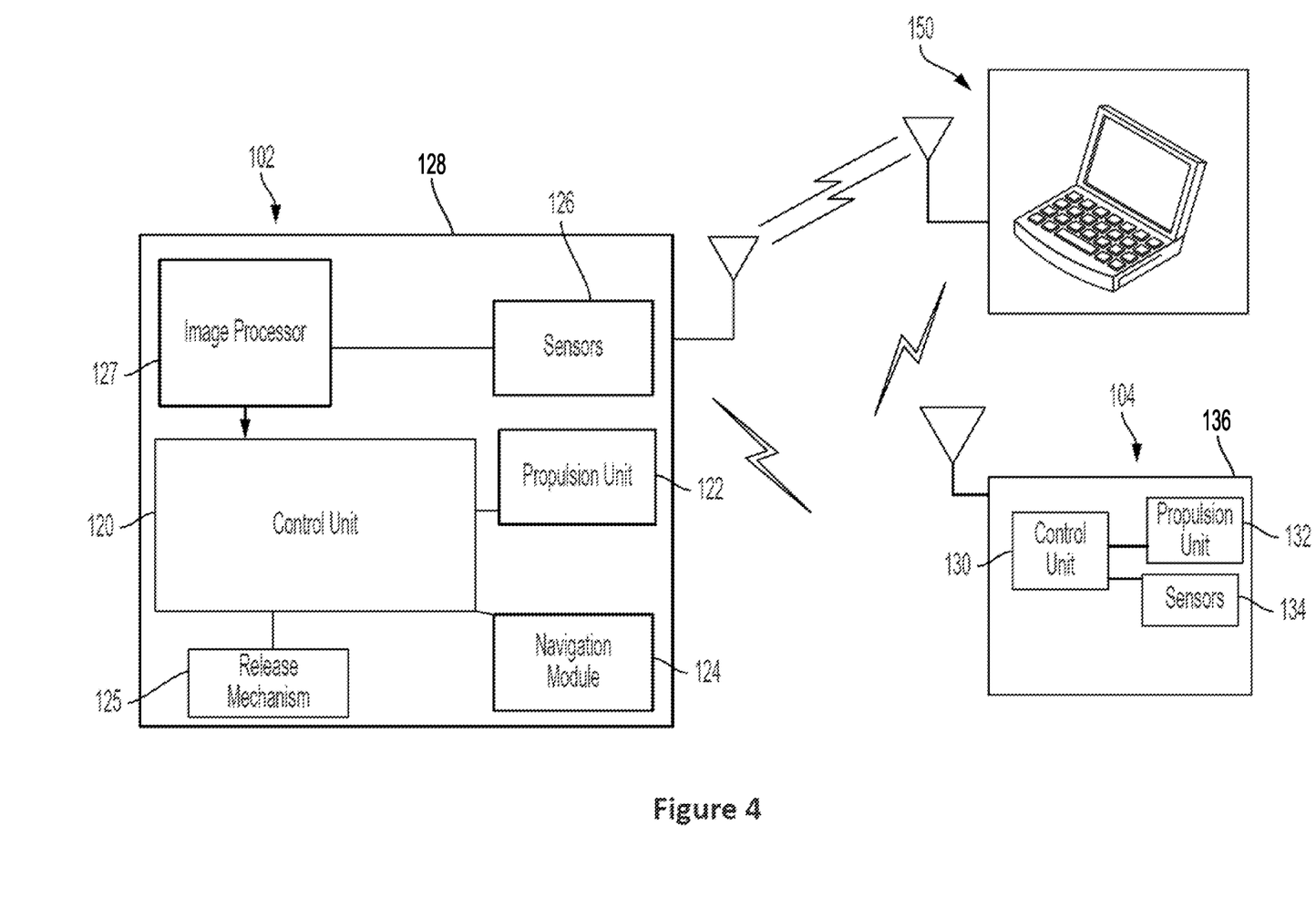
FIG. 4 illustrates a block diagram of an example of the system of FIG. 1 and a remote control system, according to an example implementation.

FIG. 4 illustrates a block diagram of an example of the system 100 of FIG. 1 and a remote control system 150, according to an example implementation. The remote control system 150 may be configured to receive data providing geolocation and environment information or other flight parameters and determine a flight plan or path. In some examples, the remote control system 150 may use a computer-based flight planner to facilitate in determining a flight path for one or both of the parent aerial vehicle 102 and the child aerial vehicle 104. The remote control system 150 may be physically located on a transport device, such as a land, air, or water vehicle, or at a ground station. Further, the control system may be part of a larger system, such as a mission management system. The mission management system may set an initial path plan which can then be updated or modified by the remote control system.

As shown in FIG. 4, the parent aerial vehicle 102 and the child aerial vehicle 104 are configured to communicate with each other as well as with the remote control system 150. The communication channels may include the parent aerial vehicle 102 and/or the remote control system 150 communicating information or instructions to the child aerial vehicle 104, as well as the child aerial vehicle 104 sending information gathered from a flight back to the aerial vehicle 102 and/or the remote control system 150.

The parent aerial vehicle 102 includes a control unit 120, which is operatively coupled to a propulsion unit 122, a navigation module 124, a release mechanism 125, a first set of sensors 126, and an image processor 127. The parent aerial vehicle 102 further includes a housing 128 that is configured to carry a child aerial vehicle, such as child aerial vehicle 104, and that is capable of containing up to a 500 pound (lb) payload. At least the propulsion unit 112 can be mounted on the housing 128.

The child aerial vehicle 104 includes a control unit 130, which is operatively coupled to a propulsion unit 132 and a second set of sensors 134. In some examples, the child aerial vehicle 104 does not comprise a navigation module but instead relies on receiving instructions from one or both of the parent aerial vehicle and the remote control system 150. The parent aerial vehicle 102 further includes a housing 136.

The control units 120, 130 control operation of the parent and child aerial vehicles 102, 104. As used herein, the term "control unit" may include any processor-based or microprocessor-based system including systems using microcontrollers, logic circuits, and any other circuit or processor including hardware, software, or a combination thereof capable of executing the functions described herein. For example, each of the control units 120, 130 may be or include one or more processors that are configured to control operation of the parent aerial vehicle 102 and the child aerial vehicle 104, respectively.

Each of the control units 120, 130, for example, is configured to execute a set of instructions that are stored in one or more storage elements in order to process data. The storage elements may be in the form of an information source or a physical memory element. The set of instructions may include various commands that instruct the control units 120, 130 to perform specific operations such as the methods and processes of the various examples of the subject matter described herein. The set of instructions may be in the form of a software program. Software may be stored on a tangible and non-transitory computer readable storage medium, such as a computer hard drive, ROM, RAM, or the like.

Thus, as described with reference to FIGS. 1-4, a system for facilitating transport of a child aerial vehicle to survey a target location is achieved. In some implementations, the region in which the target location is located may comprise adverse flying conditions and prove to be a difficult environment for the child vehicle to navigate alone. It can be helpful for a larger, parent aerial vehicle to shepherd a smaller, child aerial vehicle through adverse or rough flying conditions. In other implementations, it may simply be desired that the child aerial vehicle conserve its power source to run surveillance equipment at the target location.

Figure 5:
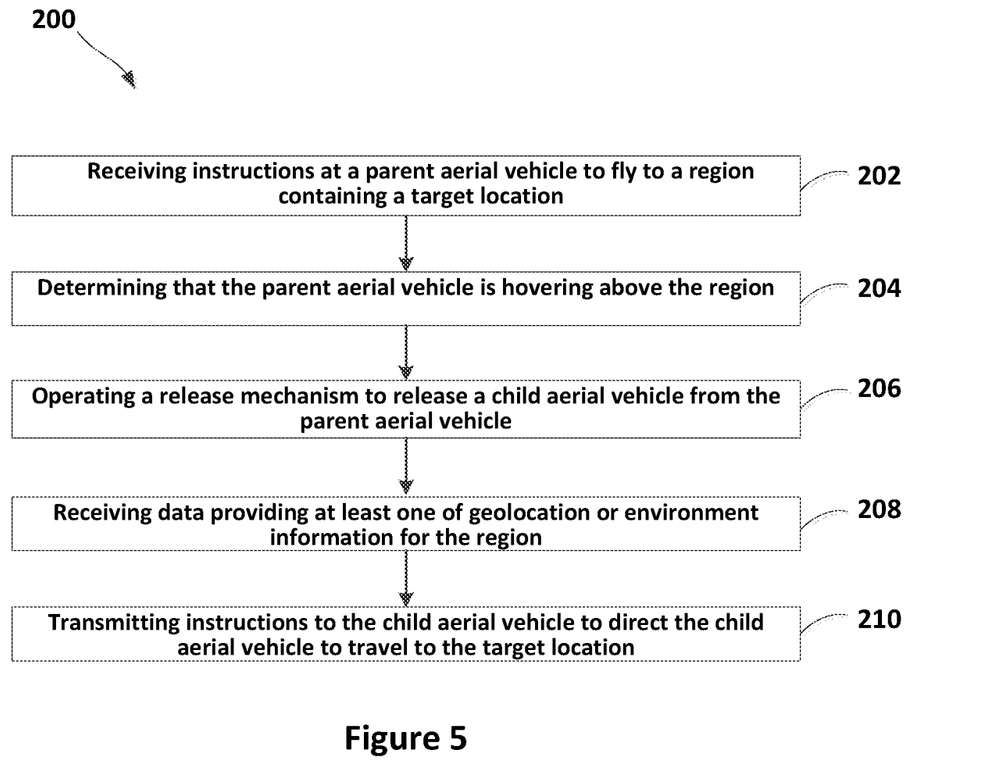
FIG. 5 illustrates a flowchart of an example of a method for flying to a target location.

FIG. 5 shows a flowchart of an example of a method 200 for flying to a target location. Method 200 shown in FIG. 5 presents an example of a method that, for example, could be used with the system 100 shown in FIG. 1, for example. Method 200 may include one or more operations, functions, or actions as illustrated by one or more of blocks 202-210. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present examples. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 202, the method 200 includes receiving instructions at a parent aerial vehicle 102 to fly to a region 106 containing a target location 108. The parent aerial vehicle 102 may receive the instructions from a remote control system such as the remote control system 150 of FIG. 4. The parent aerial vehicle 102 may be docked at a port such as launch and recover port 112, and upon receiving the instructions, the parent aerial vehicle 102 launches from the port and flies, carrying the child aerial vehicle 104, toward a region 106 containing a target location 108.

At block 204, the method 200 includes determining that the parent aerial vehicle is hovering above the region 106.

At block 206, the method 200 includes operating a release mechanism to release a child aerial vehicle 104 from the parent aerial vehicle 102. The release mechanism may include any of the example release mechanisms discussed with respect to the system 100 of FIGS. 1-4.

At block 208 the method 200 includes receiving data providing at least one of geolocation or environment information for the region 106.

At block 210 the method 200 includes transmitting instructions to the child aerial vehicle 104 to direct the child aerial vehicle 104 to travel to the target location 108. In some examples, the parent aerial vehicle 102 fully controls navigation of the child aerial vehicle 104, whereas in other examples, the parent aerial vehicle 102 only exerts partial control over navigation of the child aerial vehicle 104 and the child aerial vehicle 104 operates in a semi-autonomous state.

Figure 6:
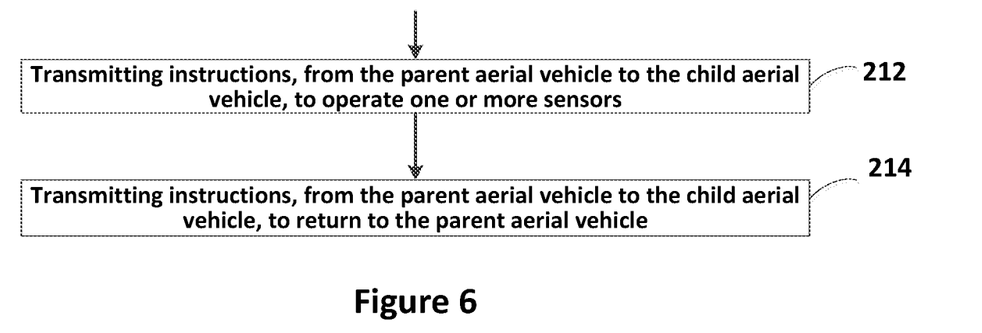
FIG. 6 illustrates another method for use with the method shown in FIG. 5, according to an example implementation.

FIG. 6 shows another method for use with the method 200 shown in FIG. 5, according to an example implementation. In FIG. 6, at block 212, the method includes transmitting instructions, from the parent aerial vehicle 102 to the child aerial vehicle 104, to operate one or more sensors. At block 214, the method includes transmitting instructions, from the parent aerial vehicle 102 to the child aerial vehicle 104, to return to the parent aerial vehicle 102.

Figure 7:
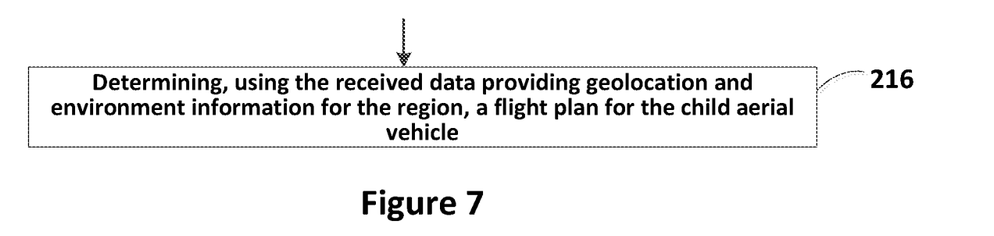
FIG. 7 illustrates another method for use with the method shown in FIG. 6, according to an example implementation.

FIG. 7 shows another method for use with the method 200 shown in FIG. 6, according to an example implementation. In FIG. 7, at block 216, the method includes determining, using the received data providing geolocation and environment information for the region, a flight plan for the child aerial vehicle 104.

Figure 8:
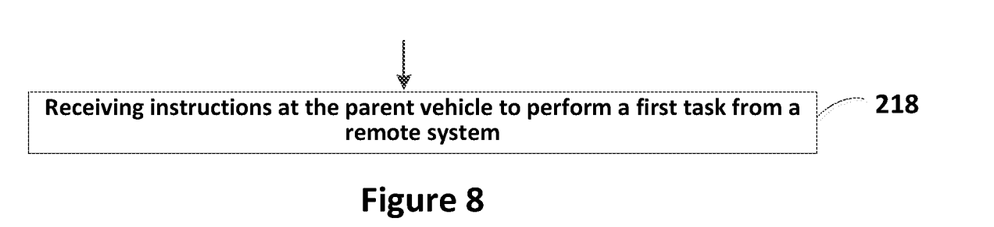
FIG. 8 illustrates another method for use with the method shown in FIG. 6, according to an example implementation.

FIG. 8 shows another method for use with the method 200 shown in FIG. 6, according to an example implementation. In FIG. 8, at block 218, the method includes receiving instructions at the parent aerial vehicle to perform a first task from a remote system. The remote system may be a system such as the remote control system 150. The first task may include any of a number of tasks, such as to launch from a docking station, to fly to a designated region, to release one or more child aerial vehicles 104, to communicate with one or more child aerial vehicles 104, or to re-couple with one or more child aerial vehicles 104, as non-limiting examples.

Figure 9:
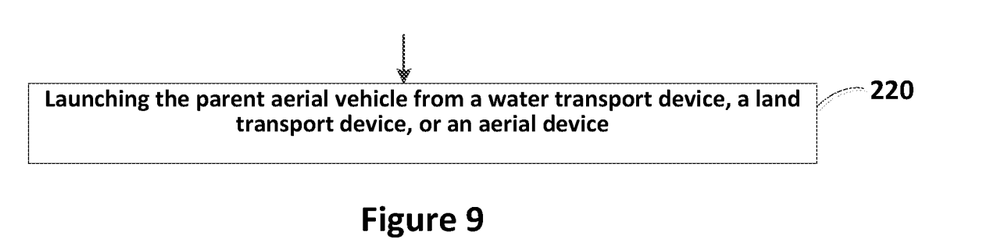
FIG. 9 illustrates another method for use with the method shown in FIG. 6, according to an example implementation.

FIG. 9 shows another method for use with the method 200 shown in FIG. 6, according to an example implementation. In FIG. 9, at block 220, the method includes launching the parent aerial vehicle from a water transport device, a land transport device, or an aerial device.

Within examples, methods and system described herein can be used to fly to a difficult to reach target location and perform surreptitious surveillance at the target location. Examples of the disclosure may find use in a variety of potential applications, particularly in the transportation industry and for any mission in which surveillance at a location is desired.

As used herein, the term "about" includes aspects of the recited characteristic, parameter, or value allowing for deviations or variations, including for example, tolerances, measurement error, measurement accuracy limitations and other factors known to skill in the art, and also ranges of the parameters extending a reasonable amount to provide for such variations.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to explain the principles of the examples, the practical application, and to enable others of ordinary skill in the art to understand the disclosure for various examples with various modifications as are suited to the particular use contemplated.

What is claimed is:

1. A system comprising:
a parent aerial vehicle comprising a first set of sensors; and
at least one child aerial vehicle comprising a second set of sensors configured for surveillance of an environment at a target location of the at least one child aerial vehicle, wherein the at least one child aerial vehicle is releasably coupled to the parent aerial vehicle;
wherein the parent aerial vehicle is configured to:
transport the at least one child aerial vehicle to a region containing the target location,
uncouple from the at least one child aerial vehicle,
after uncoupling from the at least one child aerial vehicle, remotely control the at least one child aerial vehicle by transmitting control instructions to the at least one child aerial vehicle for the at least one child aerial vehicle to (i) navigate to the target location (ii) operate the second set of sensors to conduct the surveillance at the target location and (iii) after the at least one child aerial vehicle conducts the surveillance at the target location, navigate back to the parent aerial vehicle for the parent aerial vehicle to recouple to the at least one child aerial vehicle,
after uncoupling from the at least one child aerial vehicle, determine that the at least one child aerial vehicle has reached the target location;
in response to determining that the at least one child aerial vehicle has reached the target location, return to a launch port of a transport device while the at least one child aerial vehicle is conducting the surveillance at the target location, and
in response to determining that the at least one child aerial vehicle has completed conducting the surveillance at the target location, return to the region containing the target location to navigate the at least one child aerial vehicle back to the parent aerial vehicle for the parent aerial vehicle to recouple to the at least one child aerial vehicle.

2. The system of claim 1, wherein the parent aerial vehicle and the at least one child aerial vehicle each comprise a propulsion unit for propelling through an environment, and wherein the at least one child aerial vehicle is a microscale unmanned aerial vehicle (UAV).

3. The system of claim 1, wherein the first set of sensors comprises a multifunction light detection and ranging (LIDAR) system, wherein the parent aerial vehicle further comprises a housing capable of containing up to a 500 lb payload, and wherein the parent aerial vehicle further comprises a control system for receiving and storing information and executing instructions to control the child aerial vehicle.

4. The system of claim 1, wherein the parent aerial vehicle further comprises a communication interface for receiving instructions from a remote control system, and wherein the control instructions comprise the instructions received from the remote control system.

5. The system of claim 1, wherein the first set of sensors on the parent aerial vehicle detect one or more conditions in an environment at or near the target location to facilitate generation of the control instructions for the at least one child aerial vehicle, and
wherein at least one sensor of the second set of sensors is an optical sensor or a camera.

6. The system of claim 1, wherein the parent aerial vehicle further comprises instructions stored in a non-transitory computer readable storage medium that, when executed by a processor, cause the processor to:
analyze received data providing geolocation and environment information for the region; and
plan a flight path for the child aerial vehicle to reach the target location,
wherein the control instructions comprise instructions for the child aerial vehicle to navigate to the target location in accordance with the flight path.

7. A parent aerial vehicle comprising:
a housing configured to carry a child aerial vehicle;
a release mechanism to release the child aerial vehicle from the housing;
one or more sensors for detecting one or more conditions in an environment; and instructions stored in memory that are executed by a processor to perform the functions of:
  determining that the parent aerial vehicle is hovering above a region containing a target location;
  receiving data providing geolocation and environment information for the region;
  determining a flight path for the child aerial vehicle based on the received data providing geolocation and environment information for the region;
  determining that the parent vehicle is hovering above the region containing the target location;
  in response to determining that the parent aerial vehicle is hovering above the region containing the target location, operating the release mechanism to release the child aerial vehicle;
  after releasing the child aerial vehicle, remotely controlling the child aerial vehicle by transmitting control instructions to the child aerial vehicle for the child aerial vehicle to (i) navigate to the target location (ii) operate a set of sensors to conduct surveillance at the target location and (iii) after the child aerial vehicle conducts the surveillance at the target location, navigate back to the parent aerial vehicle and recouple to the housing of the parent aerial vehicle, wherein the control instructions include the flight path
  after releasing the child aerial vehicle, determining that the child aerial vehicle has reached the target location;
  in response to determining that the child aerial vehicle has reached the target location, returning to a launch port of a transport device while the child aerial vehicle is conducting the surveillance at the target location; and
  in response to determining that the child aerial vehicle has completed conducting the surveillance at the target location, returning to the region containing the target location to navigate the child aerial vehicle to the parent aerial vehicle for the parent aerial vehicle to recouple to the child aerial vehicle.

8. The parent aerial vehicle of claim 7, further comprising a communication interface for receiving instructions from a remote control system, and wherein the control instructions comprise the instructions received from the remote control system.

9. The parent aerial vehicle of claim 7, wherein the parent aerial vehicle is configured to be stationed on and launch from a land transport device or an aerial device.

10. A method comprising:
  receiving instructions at a parent aerial vehicle to fly to a region containing a target location;
  receiving data providing at least one of geolocation or environment information for the region;
  determining a flight path for a child aerial vehicle based on the received data providing at least one of geolocation and environment information for the region;
  determining that the parent aerial vehicle is hovering above the region;
  in response to determining that the parent aerial vehicle is hovering above the region containing the target location, operating a release mechanism to release the child aerial vehicle from the parent aerial vehicle; and
  after releasing the child aerial vehicle, remotely controlling the child aerial vehicle by transmitting control instructions to the child aerial vehicle for the child aerial vehicle to (i) navigate to the target location (ii) operate a set of sensors to conduct surveillance at the target location and (iii) after the child aerial vehicle conducts the surveillance at the target location, navigate back to the parent aerial vehicle and recouple to a housing of the parent aerial vehicle, wherein the control instructions include the flight path,
  after releasing the child aerial vehicle, determining that the child aerial vehicle has reached the target location;
  in response to determining that the child aerial vehicle has reached the target location, returning to a launch port of a transport device while the child aerial vehicle is conducting the surveillance at the target location; and
  in response to determining that the child aerial vehicle has completed conducting the surveillance at the target location, returning to the region containing the target location to navigate the child aerial vehicle to the parent aerial vehicle for the parent aerial vehicle to recouple to the child aerial vehicle.

11. The method of claim 10, further comprising:
  launching the parent aerial vehicle from a land transport device or an aerial device.

12. The system of claim 1, wherein the parent aerial vehicle is configured to launch from a water transport vehicle in a littoral zone and transport the child aerial vehicle through the littoral zone to the region.

13. The system of claim 1, wherein the parent aerial vehicle is further configured to:
  determine that the parent aerial vehicle is hovering above the region containing the target location,
  wherein uncoupling from the at least one child aerial vehicle is performed in response to determining that the parent aerial vehicle is hovering above the region containing the target location.

14. The system of claim 1, wherein the parent aerial vehicle is further configured to:
  receive, from a remote control system different from the parent aerial vehicle and the at least one child aerial vehicle, (i) a first flight path for the parent aerial vehicle to navigate to the region containing the target location and (ii) a second flight path for the at least one child aerial vehicle to navigate to the target location after decoupling from the parent aerial vehicle; and
  navigate to the region in accordance with the first flight path, while coupled to the at least one child aerial vehicle,
  wherein transmitting the control instructions to the at least one child aerial vehicle comprises transmitting the second flight path to the at least one child aerial vehicle.

15. The system of claim 1, wherein the parent aerial vehicle is further configured to:
  determine a first flight path for the parent aerial vehicle to navigate to the region containing the target location;
  receive, from a remote control system different from the parent aerial vehicle and the at least one child aerial vehicle, a second flight path for the at least one child aerial vehicle to navigate to the target location after decoupling from the parent aerial vehicle; and
  navigate to the region in accordance with the first flight path, while coupled to the at least one child aerial vehicle,
  wherein transmitting the control instructions to the at least one child aerial vehicle comprises transmitting the second flight path to the at least one child aerial vehicle.

16. The system of claim 1, wherein the control instructions to operate the second set of sensors to conduct the surveillance at the target location comprise control instructions to operate the second set of sensors and store, in local memory of the at least one child aerial vehicle, surveillance data acquired by the second set of sensors and associated with the target location.

17. The system of claim 1, wherein the parent aerial vehicle is configured for longer flight endurance, higher battery power, more adverse flying conditions, and more autonomous operation than the at least one child aerial vehicle.

18. The method of claim 10, further comprising:
   receiving, by the parent aerial vehicle, from a remote control system different from the parent aerial vehicle and the child aerial vehicle, a second flight path for the parent aerial vehicle to navigate to the region containing the target location; and
   navigating the parent aerial vehicle to the region in accordance with the second flight path, while coupled to the child aerial vehicle.

19. The method of claim 10, wherein receiving instructions at the parent aerial vehicle to fly to the region containing the target location comprises receiving instructions at the parent aerial vehicle to fly to an urban environment containing a target location.

20. The method of claim 10, further comprising:
   launching from a water transport vehicle in a littoral zone, wherein receiving instructions at the parent aerial vehicle to fly to the region containing the target location comprises receiving instructions at the parent aerial vehicle to transport the child aerial vehicle through the littoral zone to the region.

\* \* \* \* \*

UNITED STATES PATENT AND TRADEMARK OFFICE
CERTIFICATE OF CORRECTION

| | | |
|---|---|---|
| PATENT NO. | : 11,531,337 B2 | |
| APPLICATION NO. | : 16/601810 | |
| DATED | : December 20, 2022 | |
| INVENTOR(S) | : William Robert Bosworth | |

It is certified that error appears in the above-identified patent and that said Letters Patent is hereby corrected as shown below:

On the Title Page (73) Assignee:
Replace "The Boeing Company, Chicago IL (US)" with -- Aurora Flight Sciences Corporation, a Subsidiary of The Boeing Company, Manassas, VA (US) --

Signed and Sealed this
Seventh Day of May, 2024

Katherine Kelly Vidal
*Director of the United States Patent and Trademark Office*